J. T. McINTYRE.
AIR BLOWER FOR FORGES.
APPLICATION FILED OCT. 31, 1911.
1,030,418.
Patented June 25, 1912.
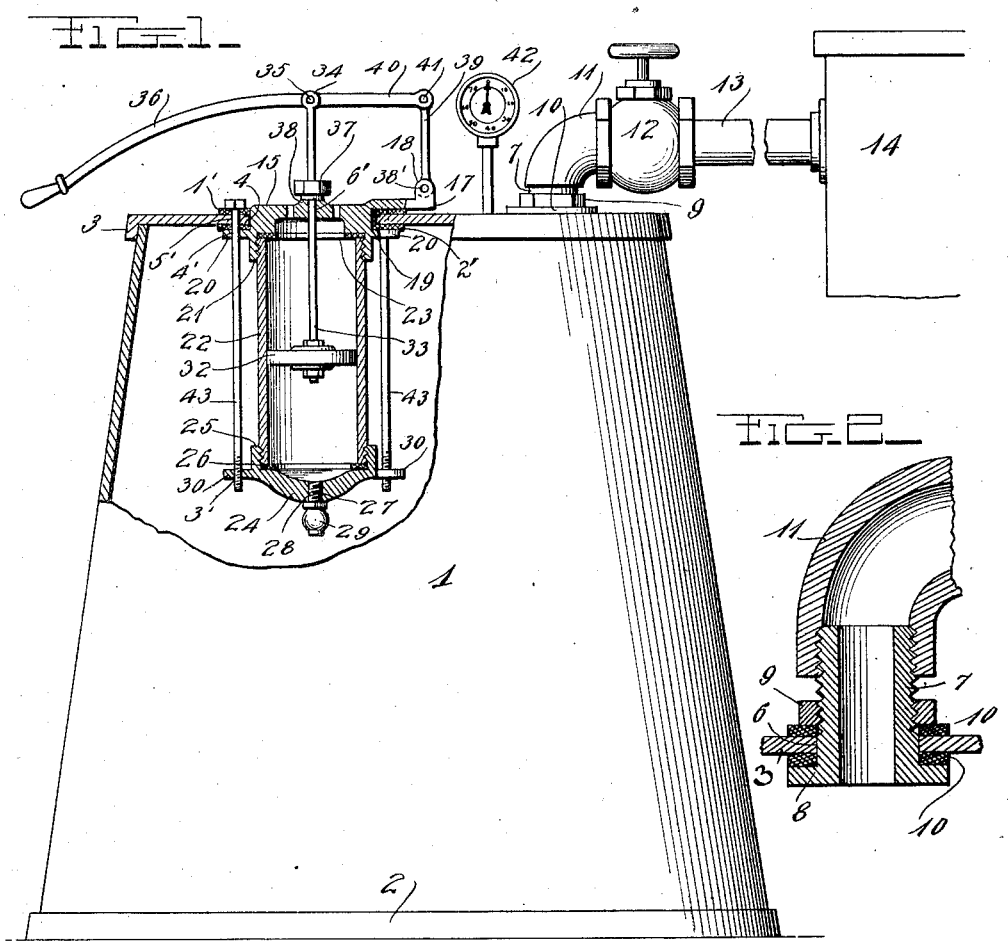
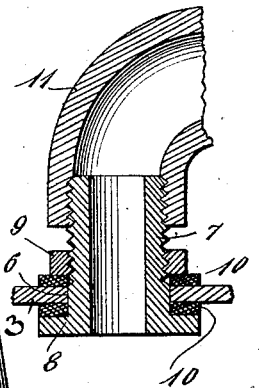
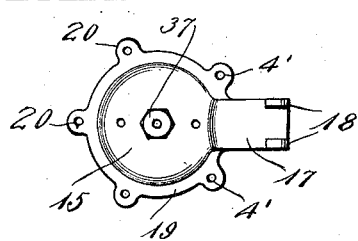
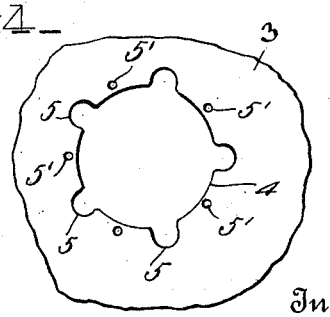
Witnesses
J. R. Pierce
E. G. McKee
Inventor
J. T. McIntyre.
By Geo. W. Sues. Attorney

UNITED STATES PATENT OFFICE.

JOHN T. McINTYRE, OF JACKSON, ALABAMA.

AIR-BLOWER FOR FORGES.

1,030,418.  Specification of Letters Patent.  Patented June 25, 1912.

Application filed October 31, 1911. Serial No. 657,788.

*To all whom it may concern:*

Be it known that I, JOHN T. McINTYRE, a citizen of the United States, and a resident of Jackson, in the county of Clarke and State of Alabama, have invented certain new and useful Improvements in Air-Blowers for Forges, of which the following is a specification, reference being had to the accompanying drawings.

This invention has relation to certain new and useful improvements in portable air blowers employed in connection with blacksmiths' forges; and the object of my invention is to provide a portable device of this general character, of a simple and inexpensive nature and of a compact and durable construction, which shall be capable of being set up adjacent to a forge in a manner enabling the smith to instantly turn on the air when needed, and as readily check or control the air supply in regulating the forge fire.

With these and other objects in view the present invention consists in the combination and arrangement of parts as will be hereinafter more fully described and finally pointed out in the appended claim, it being further understood that changes in the specific structure shown and described may be made within the scope of the claim, without departing from the spirit of the invention.

In the accompanying drawings forming a part of this specification and in which like numerals of reference indicate similar parts in the several views: Figure 1, shows an elevational view of a compressed air blower embodying my invention with parts broken away. Fig. 2, shows an enlarged sectional detail disclosing the manner of securing the nipple. Fig. 3, is a top view of the upper pump cap. Fig. 4, shows a fragmentary portion of the top of the air tank.

In carrying out the aim of my invention, I employ a suitable tank 1, slightly cone shape, having a bottom 2, and a top 3. This tank is air tight and above has a circular aperture 4, as shown in Fig. 4, from which is continued the access openings 5, five such access openings being shown in Fig. 4. Adjacent to this opening 4, is a nipple opening 6, indicated in Fig. 2. Held within the opening 6 is the exteriorly threaded stem 7, of a suitable nipple having the flange 8. Working upon this nipple is the nut 9, and interposed between the nut 9 and the top plate 3 of the tank and the flange 8, and the under face of the tank, are the resilient washers 10, insuring an air tight union of the nipple with the tank top 3. Threading upon the nipple stem 7, is the elbow 11, which supports a suitable controlling valve 12, from which is continued an air supply pipe 13, lead to the forge 14, the tank 1, being placed at a suitable distance from the forge.

In connection with the tank 1, I use a pump of special construction, including the upper cap plate 15, having the central opening 6′, and the extending bracket 17, provided with the apertured lugs 18. The cap is in the form of a cylindrical member and is provided with the outstanding base flange 19, from which extend the apertured ears 20, as clearly shown in Fig. 3. From the under face of the flange 19, extends a circumscribing interiorly threaded flange 21, which is arranged to receive the pump cylinder 22, which is exteriorly threaded. A suitable washer 23, is interposed between the end of the cylinder 22, and the upper cap 15.

Held to the lower exteriorly threaded end of the pump cylinder 22, is the bottom cap 24, having the threaded circumscribing flange 25, arranged to receive the pump cylinder 22, a suitable washer 26, being interposed between the end of the pump cylinder 22, and the bottom cap 24, as shown. This lower cap 24, has a centrally positioned opening 27, arranged to receive the threaded stem 28, of a suitable check valve 29. This lower cap plate is also provided with a plurality of outstanding apertured ears 30, similar to the ears 20, extending from the upper cap plate, and arranged to register therewith.

Slidably held within the cylinder 22, is the piston 32, secured to the lower end of the piston rod 33, which rod at its upper end has the apertured ears 34, arranged to receive the pin 35, by means of which the lever 36, is connected to the piston rod 35. A suitable packing gland 37, is secured to the neck 38, of the cap plate 15. Held within the bracket ears 18, is a pin 38′, giving pivotal support to the link 39, which is secured to the end 40, of the operating lever 36, the link 39, being secured to the lever by means of the pin 41. A suitable pressure gage 42 extends from the tank to indicate the air pressure at all times within the tank.

The air pump is secured to the upper plate 3 of the tank by means of the stay bolts 43, five such bolts being used. These bolts are arranged to pass through the openings 5′, shown in Fig. 4, which are positioned between the opening 5. These openings 5′, exactly register with the unthreaded openings 4′, within the ears 20, and the threaded openings 3′, within the ears of the lower cap plate 24.

A suitable washer 2′, is placed against the under face of the upper plate 3, and against this washer 2′, is placed the upper face of the flange 19. In this position of the pump the stay bolts 43, are inserted into the openings 5′, through the openings 4′, and screwed into the threaded openings 3′. In then tightening the stay bolts the pump is forced against the washer 2′, so that an air tight union of the pump with the tank is insured. It will be noticed that the bolts not only secure the pump under force to the tank, but these bolts also tend to securely hold the caps 15 and 24 to the cylinder 22. The threading upon the ends of the cylinder 22 is simply intended to hold the instrumentalities together, so that the completed pump may be inserted within the tank opening.

As shown in the drawings, the heads of the stay bolts 43 rest upon the packing ring 1′.

The device is simple and inexpensive in construction and both durable and efficient in operation.

Having thus described my said invention, what I claim as new and desire to secure by United States Letters Patent is:—

In a device of the character described, the combination with a tank having a circular aperture with communicating access openings and bolt openings between said access openings, of a pump including an upper cylindrical cap with a base flange having standing apertured ears, a bracket being continued from said cap having supporting lugs a threaded circumscribing flange extending from said cap, a pump cylinder held within said threaded flange, a bottom cap having a threaded cylindrical flange held to the lower end of said cylinder said cap also having outstanding threaded ears registering with said apertured ears, a piston within said cylinder, a stem secured to said piston and passing through an opening within said upper cap, a link pivotally held to said supporting lugs, an operating lever secured to said stem and link said cap and ears being arranged to pass through said aperture and access openings, and stay bolts passing through said bolt openings said upper cap ears and screwing into said threaded ears to force said pump against the under face of the top of said tank, as and in the manner set forth.

In testimony whereof I affix my signature, in presence of two witnesses.

JOHN T. McINTYRE.

Witnesses:
W. W. BAYLES,
W. J. ORSO.